United States Patent
Beyer

(10) Patent No.: US 6,694,377 B1
(45) Date of Patent: Feb. 17, 2004

(54) COMMUNICATIONS INTERFACE FOR THE SERIAL TRANSMISSION OF DIGITAL DATA, AND CORRESPONDING DATA TRANSMISSION METHOD

(75) Inventor: Hans-Jürgen Beyer, Wildenfels (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/582,048
(22) PCT Filed: Dec. 7, 1998
(86) PCT No.: PCT/DE98/03597
§ 371 (c)(1),
(2), (4) Date: Jun. 16, 2000
(87) PCT Pub. No.: WO99/32984
PCT Pub. Date: Jul. 1, 1999

(30) Foreign Application Priority Data

Dec. 18, 1997  (DE) .......................................... 197 56 540

(51) Int. Cl.⁷ ............................................... G06F 15/16
(52) U.S. Cl. ........................ 709/250; 375/220; 375/260
(58) Field of Search ................................. 709/250, 230, 709/233, 235, 208; 375/220, 260

(56) References Cited

U.S. PATENT DOCUMENTS

| 5,025,500 | A | * | 6/1991 | Phinney ........................ 370/462 |
| 5,259,002 | A | * | 11/1993 | Carlstedt ...................... 375/260 |
| 5,511,069 | A | * | 4/1996 | England et al. .............. 370/276 |
| 5,754,780 | A | * | 5/1998 | Asakawa et al. ............ 709/208 |

FOREIGN PATENT DOCUMENTS

| CN | 1058681 A | 2/1992 |
| EP | 0 568 520 A2 | 11/1993 |
| EP | 0 568 520 | 11/1993 |
| EP | 568520 A2 * | 11/1993 ............ H04L/12/46 |

* cited by examiner

Primary Examiner—Frantz B. Jean
(74) Attorney, Agent, or Firm—Staas & Halsey LLP

(57) ABSTRACT

A communications interface and a data transmission method for the serial transmission of digital data are described, in which at least three signal lines (Tx0, Tx1, Tx2) are provided, which can each have a "high" or a "low" level impressed on them, and a data bit which is to be transmitted can be coded by changing the level of two of the at least three signal lines, and hence as a result of the transition from a first level triplet and to a second level triplet.

9 Claims, 1 Drawing Sheet

COMMUNICATIONS INTERFACE FOR THE SERIAL TRANSMISSION OF DIGITAL DATA, AND CORRESPONDING DATA TRANSMISSION METHOD

BACKGROUND INFORMATION

With serial data transmission, it is often necessary to make a compromise between the parameters of speed, interference immunity and current consumption. The highest data throughput at a given clock frequency is achieved by synchronous transmission using separate data, clock and control lines. However, such synchronous transmission is particularly susceptible to interference, and it has only conditional suitability for the use of data protection mechanisms for recognizing multiple errors.

Other methods, such as synchronous transmission with clock recovery, or asynchronous transmission, are significantly slower at the same clock frequency. The reason for this is the necessary transmission of additional information for synchronization and the multiple sampling required. The transmission rate can be increased by the proportionally rising current consumption only to a limited extent.

SUMMARY

An object of the present invention is to provide a communications interface for the serial transmission of digital data and a serial data transmission method for the transmission of digital data on a bit by bit basis, each of which can be used to achieve serial transmission which is immune to interference and has the speed advantages of synchronous transmission and reliable synchronization between the clock and the data.

Conventionally the transmission path is designed by shielding or limiting the length, to be so reliable that recognition of individual errors is sufficient to ensure transmission with adequate interference immunity. In this case, the start and end of data transmission are synchronized using start/stop synchronization via the control line. Bit synchronization is monitored by counting the clock pulses between start and stop. The data itself is protected by means of a parity bit.

In the case of synchronous transmission with clock recovery, the useful information is coded such that the resultant bit stream contains an adequate number of edge changes (Manchester coding, bit stuffing, 4B/5B etc.), which can be used to recover the send clock signal (bit synchronization). Start/stop synchronization is carried out using special bit sequences which do not occur in the rest of the telegram (BOF, EOF). The disadvantage of this is the relatively large volume of data to be transmitted as a result of coding (factor 1.25 . . . 2). In this context, the additional start and end identifier is of particular concern with small volumes of useful data.

With asynchronous transmission, bit synchronization is carried out using a start and stop bit. However, synchronization is assured only during a limited number of bit times, so that this sequence has to be repeated regularly. Start/stop synchronization of a telegram is carried out, as it is for synchronous transmission with clock recovery, with an explicit start and end identifier. The disadvantage here, too, is the relatively large volume of data to be transmitted. In addition, with asynchronous transmission, multiple sampling is necessary, which either reduces the data rate or increases current consumption.

The present invention solves the problem in that the information elements to be transmitted, the data, the clock signal and the start and end of data transmission (start/stop), are converted into special state sequences in the transmitter in accordance with a defined coding specification, and are transformed back from these state sequences into the information elements again in the receiver. To this end, a communications interface for the serial transmission of digital data is provided, in which at least three signal lines are provided which can each have a "high" or a "low" level impressed on them, and a data item, which is to be transmitted, can be coded by changing the level of two of the at least three signal lines (Tx0, Tx1, Tx2), and hence as a result of the transition from a first level n-tuple to a second level n-tuple.

In the case of exactly three signal lines (Tx0, Tx1, Tx2), the data item to be transmitted can be coded as a result of the transition from a first level triplet to a second level triplet. Since the communications interface can also be used to transmit synchronization information, for example, the term "data item" additionally at least includes such information as well.

The permissible transitions from a first level n-tuple or first level triplet to a second level n-tuple or second level triplet are defined in a coding scheme and can be stored in this form in the communication subscribers, which can be communicatively connected via the communications interface. The coding schemes in the receiver can therefore also be used, in particular, for error recognition and suppression.

This makes it possible to carry out a serial data transmission method for the bitwise transmission of digital data on a bit by bit basis using at least three signal lines which can each have a "high" or a "low" level impressed on them, a data bit which is to be transmitted being coded by changing the level of two of the at least three signal lines (Tx0, Tx1, Tx2), and hence as a result of the transition from a first level triplet to a second level triplet.

In this case, data transmission is particularly immune to interference if the data bit which is to be transmitted is coded by a change in the level of two of the at least three signal lines.

If the change in the level of the at least two signal lines occurs contradirectionally, susceptibility to interference is reduced even further.

If the start and end of data transmission can be coded by inverting the respective levels of the at least three signal lines, start/stop synchronization with only one bit time is possible, so that, with short telegrams, a high data throughput is possible.

DETAILED DESCRIPTION

In accordance with a defined coding specification, which is explained below with reference to FIG. 1, the information elements to be transmitted are converted into special state sequences.

Figure 1:
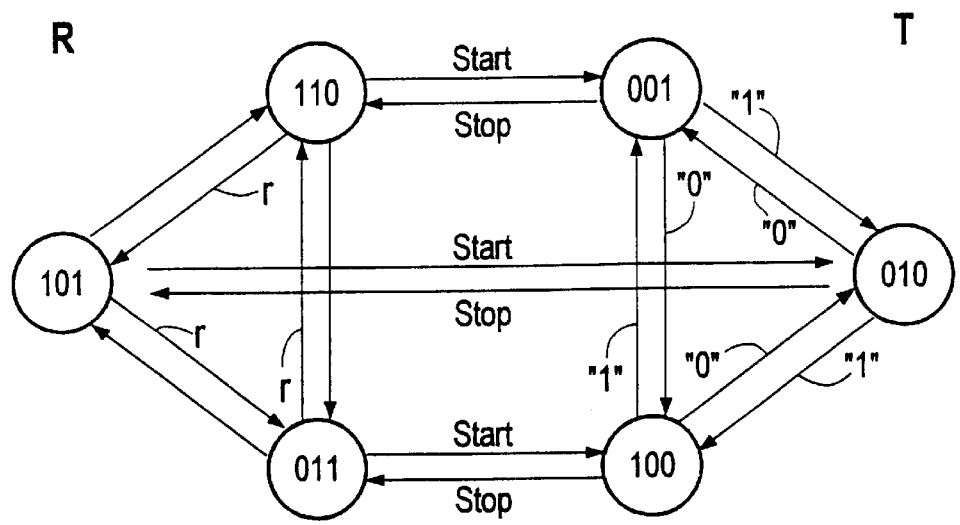
FIG. 1 shows the principle of state sequence coding using a state diagram according to the example embodiment of the present invention

The state diagram shown in FIG. 1 has six nodes with transitions defined between these nodes. Each of the nodes represents a level, status or state triplet. During bus transmission, only the states $001_B$, $010_B$ and $100_B$ are used, because, with these state triplets, exactly two levels change contradirectionally whenever there is a transition from a first to a second triplet. Under these circumstances, the transition from the level triplet $001_B$ to the level triplet $010_B$ identifies the: transmission of a logic 1; the transition from the level triplet $001_B$ to the level triplet $100_B$ identifies the transmission of a logic 0; etc.

During bus inactivity R, only the states $110_B$, $101_B$ and $011_B$ are used, since, again, exactly two levels change contradirectionally during transition from a first state triplet of this quantity to a second state triplet of this quantity.

To change from the operating mode of data transmission T to the operating mode of bus inactivity R or to change from the operating mode of bus inactivity R to the operating mode of data transmission T, a start/stop transition is necessary. This start/stop transition is distinguished by inversion of all three levels. If, in the last step of data transmission, a logic 1 is transmitted with the change from the level triplet $010_B$ to the level triplet $100_B$, there follows a stop transition from the level triplet $100_B$ to the level triplet $011_B$. This is followed by the transition to the operating mode of bus inactivity R, in which the levels associated with the level triplet $110_B$ are applied to the three signal lines. From this state of bus inactivity R, a start transition is used to change to the operating mode of data transmission T—level triplet $001_B$—again, a logic 1 being identified by a transition to the level triplet $010_B$ and a logic 0 being identified by a transition to the level triplet $100_B$.

The present state of the three signal lines is denoted by a respective node on the state diagram. At a particular instant, only one of the nodes on the state diagram is ever valid. The nodes on the state diagram describe, as it were, positions on a path, the transitions defined between the nodes stipulating the possible paths. Transitions not defined on the state diagram are not possible; thus, FIG. 1, direct transition from the level triplet $011_B$ to the level triplet $011_B$, for example, is not possible. The coding specification defined using the state diagram shown in FIG. 1 is called a state sequence coding. In addition, it is also possible to use data protection mechanisms for recognizing multiple errors and for error correction.

Figure 2:
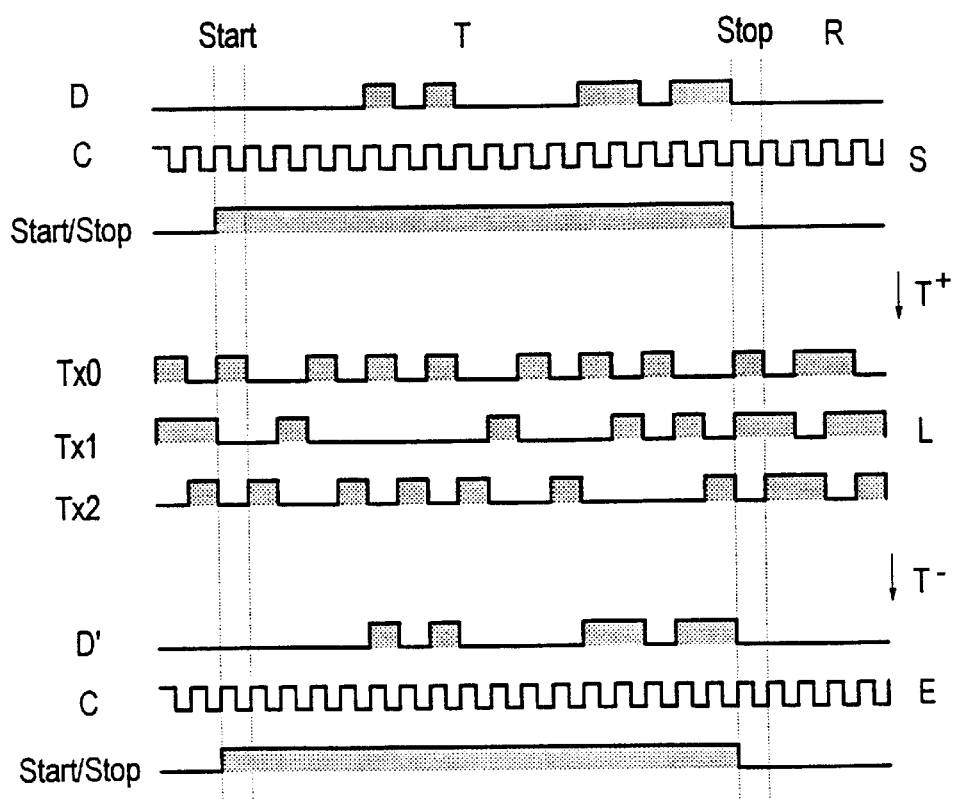
FIG. 2 shows the transmission of useful data with the state sequence coding according to the example embodiment of the present intention.

FIG. 2 shows an example of data transmission based on the principle of state sequence coding. Both the transmitter S (first ordinate in the upper third) and the receiver E (first ordinate in the lower third) contain the data D, D' in bit-serial form. The data D, D' is distinguished conventionally by alternate "high" and "low" levels, a plurality of successive similar levels being distinguishable on the basis of the clock signal C (central ordinate, both in the upper third and in the lower third). Data transmission starts when a high level is impressed on the start/stop line and ends when the level of this line changes to low again (third ordinate both in the upper and in the lower third).

The central third shows the signal sequence on the transmission path L, produced by the three signal lines (Tx0, Tx1, Tx2) after the transmission data D has been subjected to state sequence coding (first ordinate, upper third). The transmission data D is converted into bit-serial data D' again in the receiver E in accordance with the coding specification of the state sequence coding (first ordinate, lower third).

What is claimed is:

1. A communications interface for serial transmission of digital data, comprising:
   at least three signal lines upon which a "high" signal or a "low" signal is impressed; and
   a data item encoded by changing a level of at least two of the at least three signal lines to provide a transition from a first level n-tuple to a second level n-tuple.

2. The communications interface according to claim 1, wherein the first level n-tuple and the second level n-tuple are a first level triplet and a second level triplet, respectively.

3. The communications interface according to claim 1, wherein the level change on the at least two signal lines occurs contradirectionally.

4. The communications interface according to claim 1, wherein a start of data transmission and an end of data transmission is coded by inverting respective levels of the at least three signal lines.

5. A method of serial transmission of data for transmitting digital data on a bit-by-bit basis, comprising:
   providing at least three signal lines upon which a "high" signal or a "low" signal is impressed; and
   transmitting a data item by changing the level of two of the at least three signal lines to provide a transition from a first level n-tuple to a second level n-tuple.

6. The method according to claim 5, wherein the first level n-tuple and the second level n-tuple are a first level triplet and a second level triplet, respectively.

7. The method according to claim 5, further comprising:
   coding a start of data transmission and an end of data transmission by inverting respective levels of the at least three signal lines.

8. A programmable controller for at least one of controlling and monitoring a technical process, the controller being communicatively connected to other programmable controllers, comprising:
   a communications interface for serial transmission of digital data, the interface including
      at least three signal lines upon which a "high" signal or a "low" signal is impressed, and
      a data item encoded by changing a level of at least two of the at least three signal lines to provide a transition from a first level n-tuple to a second level n-tuple.

9. A programmable controller for at least one of controlling and monitoring a technical process, the controller being communicatively connected to other programmable controllers, comprising:
   a communications interface for serial transmission of digital data configured to perform the steps of
      providing at least three signal lines upon which a "high" signal or a "low" signal is impressed, and
      transmitting a data item by changing the level of two of the at least three signal lines to provide a transition from a first level n-tuple to a second level n-tuple.

* * * * *